United States Patent
Deglin et al.

(10) Patent No.: US 11,386,022 B2
(45) Date of Patent: Jul. 12, 2022

(54) MEMORY STORAGE DEVICE INCLUDING A CONFIGURABLE DATA TRANSFER TRIGGER

(71) Applicant: Samsung Electronics Co., Ltd., Suwon-si (KR)

(72) Inventors: Richard N. Deglin, Monterey, CA (US); Atrey Hosmane, Bengaluru (IN); Srinivasa Raju Nadakuditi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 16/896,050

(22) Filed: Jun. 8, 2020

(65) Prior Publication Data
US 2021/0279189 A1 Sep. 9, 2021

Related U.S. Application Data

(60) Provisional application No. 62/985,824, filed on Mar. 5, 2020.

(51) Int. Cl.
*G06F 3/06* (2006.01)
*G06F 13/16* (2006.01)

(52) U.S. Cl.
CPC ........ *G06F 13/1668* (2013.01); *G06F 3/0604* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,792,027 B2 | 9/2010 | Tatar et al. | |
| 8,553,469 B2 | 10/2013 | Berke | |
| 8,738,841 B2 | 5/2014 | Olbrich et al. | |
| 9,152,580 B1 | 10/2015 | Chau et al. | |
| 2007/0195777 A1 | 8/2007 | Tatar et al. | |
| 2011/0276578 A1* | 11/2011 | Allalouf | G06F 3/0689 711/E12.001 |
| 2014/0281147 A1 | 9/2014 | Yoshimura | |
| 2015/0186068 A1 | 7/2015 | Benisty et al. | |

* cited by examiner

*Primary Examiner* — Scott C Sun
(74) *Attorney, Agent, or Firm* — Lewis Roca Rothgerber Christie LLP

(57) ABSTRACT

A storage device includes: a host interface to receive a host command from a host device over a storage interface; one or more memory translation layers to execute one or more operations associated with the host command to retrieve one or more chunks of data associated with the host command from storage memory; a bitmap circuit including a bitmap to track a constrained order of the one or more chunks of data to be transferred to the host device; and a transfer trigger to trigger a data transfer to the host device for the one or more chunks of data in the constrained order according to a state of one or more bits of the bitmap.

20 Claims, 8 Drawing Sheets

MEMORY STORAGE DEVICE INCLUDING A CONFIGURABLE DATA TRANSFER TRIGGER

CROSS-REFERENCE TO RELATED APPLICATION(S)

This application claims priority to and the benefit of U.S. Provisional Application No. 62/985,824, filed on Mar. 5, 2020, entitled "MEMORY STORAGE DEVICE FOR PIPELINE IDLE TIME REDUCTION," the entire content of which is incorporated herein by reference.

FIELD

Aspects of one or more example embodiments of the present disclosure relate to storage devices, and more particularly, to a storage device including a configurable data transfer trigger, and a method including the same.

BACKGROUND

A storage system generally includes host devices and storage devices. A host device may access data stored in a storage device by transmitting commands to the storage device. For example, the host device may transmit a READ command to the storage device to access data stored in one or more logical blocks of the storage device. In this case, the READ command may include several phases, for example, such as a command issue phase, a data transfer phase, and a response phase. During the command issue phase, the host device may issue the READ command to the storage device, such that the storage device retrieves data associated with the READ command stored in the logical blocks of the storage device. The storage device may transfer the data corresponding to the READ command to the host device during the data transfer phase, and once all of the data has been transferred to the host device, the storage device may transmit a response to the host device during the response phase, indicating that all of the data has been successfully transferred.

The above information disclosed in this Background section is for enhancement of understanding of the background of the present disclosure, and therefore, it may contain information that does not constitute prior art.

SUMMARY

One or more example embodiments of the present disclosure are directed to a storage device including a configurable automatic data transfer trigger. The storage device may track out-of-order completions to automatically trigger an in-order data transfer. In some embodiments, the data transfer trigger of the storage device may be dynamically configurable to reduce or minimize idle time on a data transfer bus.

According to one or more example embodiments of the present disclosure, a storage device includes: a host interface to receive a host command from a host device over a storage interface; one or more memory translation layers to execute one or more operations associated with the host command to retrieve one or more chunks of data associated with the host command from storage memory; a bitmap circuit including a bitmap to track a constrained order of the one or more chunks of data to be transferred to the host device; and a transfer trigger to trigger a data transfer to the host device for the one or more chunks of data in the constrained order according to a state of one or more bits of the bitmap.

In an example embodiment, the one or more chunks of data may be retrieved from the storage memory in an order that is different from the constrained order.

In an example embodiment, consecutive bits from among the one or more bits of the bitmap may correspond to the constrained order.

In an example embodiment, an initial bit from among the consecutive bits may correspond to a first chunk of data from among the one or more chunks of data in the constrained order.

In an example embodiment, a next adjacent bit from among the consecutive bits may correspond to a second chunk of data from among the one or more chunks of data in the constrained order.

In an example embodiment, the transfer trigger may be configured to trigger the data transfer in response to a specified number of bits starting from an initial bit from among the one or more bits of the bitmap having a changed state from an initial state.

In an example embodiment, the one or more memory translation layers may be configured to set a corresponding bit in the bitmap to have the changed state in response to executing a corresponding operation from among the one or more operations associated with the host command.

In an example embodiment, the one or more memory translation layers may be configured to set the specified number of bits to have the changed state in an order that is different from the constrained order.

In an example embodiment, the bitmap circuit may be configured to dynamically change the specified number of bits according to a threshold.

In an example embodiment, the threshold may set the specified number of bits and a position of the initial bit from among the specified number of bits.

According to one or more example embodiments of the present disclosure, a method for triggering a data transfer from a storage device to a host device, includes: receiving, by the storage device, a host command from the host device to retrieve data from storage memory; assigning, by the storage device, a bitmap for the host command; executing, by the storage device, one or more operations associated with the host command to retrieve one or more chunks of the data from the storage memory; changing, by the storage device, a state of a corresponding bit from among one or more specified bits in the bitmap in response to an execution completion of a corresponding operation from among the one or more operations; monitoring, by the storage device, the specified bits of the bitmap; and triggering, by the storage device, a data transfer of the one or more chunks of the data in a constrained order in response to the specified bits of the bitmap having a changed state from an initial state.

In an example embodiment, the one or more operations associated with the host command may be executed to retrieve the one or more chunks of the data in an order that is different from the constrained order.

In an example embodiment, the one or more specified bits may correspond to one or more consecutive bits of the bitmap, and the one or more consecutive bits may correspond to the constrained order.

In an example embodiment, an initial bit from among the consecutive bits may correspond to a first chunk of data from among the one or more chunks of the data in the constrained order.

In an example embodiment, a next adjacent bit from among the consecutive bits may correspond to a second chunk of data from among the one or more chunks of data in the constrained order.

In an example embodiment, the data transfer may be triggered in response to the specified number of bits starting from an initial bit having the changed state.

In an example embodiment, the method may further include: changing, by the storage device, a number of the specified bits according to a threshold.

In an example embodiment, the threshold may set the specified number of bits and a position of the initial bit from among the specified number of bits.

According to one or more example embodiments of the present disclosure, a storage device includes: a storage controller to execute one or more operations associated with a host command received from a host device over a storage interface, the one or more operations to retrieve one or more chunks of data associated with the host command from storage memory; and a bitmap circuit to track a constrained order of the one or more chunks of data to be transferred to the host device, the bitmap circuit including: an assigned bitmap including one or more specified bits corresponding to the constrained order; a compare bitmap circuit to generate a compare bitmap according to a count value and a start position indicating the one or more specified bits in the assigned bitmap; and a trigger bitmap circuit to compare the assigned bitmap with the compare bitmap to determine a state of the specified bits in the assigned bitmap, and to trigger a data transfer of the one or more chunks of data to the host device in the constrained order according to the state of the specified bits. The trigger bitmap circuit is to trigger the data transfer in response to the specified bits having a changed state from an initial state.

In an example embodiment, the storage controller may be configured to change the state of a corresponding bit from among the specified bits to the changed state in response to a corresponding operation from among the one or more operations being completed, and the one or more operations may be completed in an order that is different from the constrained order.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
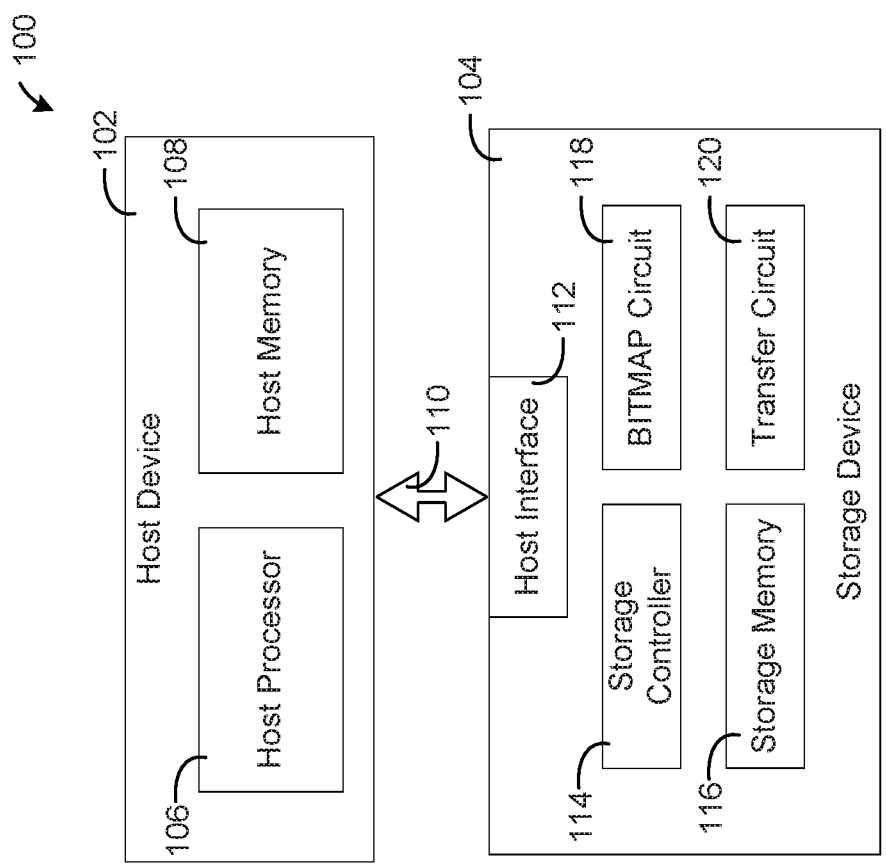
FIG. 1 is a system diagram of a storage system, according to one or more example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

A storage device may execute a single READ command issued from a host device by performing one or more READ operations to retrieve data corresponding to the READ command stored in one or more logical blocks of the storage device. For example, depending on a size of the data corresponding to the single READ command, the storage device may execute multiple READ operations to retreive portions or chunks of the data from the logical blocks. In this case, depending on a workload of the storage device, the READ operations may be completed out of order, such that the portions or chunks of data retreived from the logical blocks may be received out of order. However, the storage device may transmit the data associated with the single READ command to the host device in a proper order (e.g., a predetermined order or a particular order), for example, from a lowest Logical Block Address (LBA) to a highest LBA.

For example, a storage device may execute a READ command using a host-to-device COMMAND frame, one or more device-to-host DATA frames, and a device-to host RESPONSE frame. The COMMAND frame for the READ command may specify a starting LBA and an LBA count, and one DATA frame may transfer up to, for example, 1024 bytes of data. In this case, if the READ command requires multiple DATA frames to be transferred to the host device, the DATA frames may be transferred in a predetermined order, for example, from the lowest LBA to the highest LBA. Further, the storage device may perform multiple READ operations to execute the single READ command, such that each READ operation retrieves, for example, a portion or a chunk of data (e.g., a page of data) associated with the single READ command from a corresponding logical block. However, the READ operations may be completed out of order depending on a workload of the storage device, such that the portions or chunks of data are retrieved out of order from the predetermined order in which the data is transferred to the host device. In this case, the storage device may convert out-of-order operation completions into in-order DATA frame transmissions to transmit the DATA frames to the host device in the predetermined order.

Further, the storage device may transfer the in-order DATA frames to the host device through connections established between the storage device and the host device, such that the connections may be opened and closed as needed or desired. In this case, the connections may be circuit-switched, such that a connection may not be shared with other host devices and/or other storage devices while the connection is open. Because connection resources may be limited, efficient use of the connections may be desired to improve or maximize performance. Moreover, a connection may degrade from a full-duplex state (e.g., a two-way data transfer direction) to a half-duplex state (e.g., a one-way data transfer direction) when one of the host device or the storage device determines that there are no more DATA frames to transmit. In the half-duplex state, the connection may become idle, resulting in wasted bandwidth. Accordingly, it may be desired to keep the connections as short as possible to reduce or minimize the half-duplex state, but not too short such that overhead of connection establishment becomes dominant.

According to one or more example embodiments of the present disclosure, a storage device may include a hardware module (e.g., a BITMAP circuit) to track out-of-order operation completions to be converted into in-order DATA frame transmissions. For example, in some embodiments, the hardware module may include an array of bitmaps, and each of the bitmaps may correspond to a single host command (e.g., a single READ command). In this case, each bit of the bitmap may correspond to one operation (e.g., one READ operation) from among multiple operations (e.g., multiple READ operations) that may be performed to execute the single host command (e.g., the single READ command). In other words, each of the bits may correspond to a portion or a chunk of data (e.g., a page of data) that is retrieved as a result of a completion of a corresponding operation (e.g., a corresponding READ operation) from among the multiple operations (e.g., the multiple READ operations) associated with the single host command (e.g., the single READ command). As each of the portions or chunks of data (e.g., the pages of data) is received as a result of a completion of a corresponding operation, a state of the corresponding bit in the bitmap may be changed from an initial state to a changed state (e.g., from a 0 to a 1). In this case, because the portions or chunks of data may be read out of order, the bits in the bitmap may be changed to the changed state out of order. A data transfer to the host device may be automatically triggered in response to a sufficient number of bits (e.g., of consecutive bits) starting from an initial bit (e.g., a least significant bit) from among the bits of the corresponding bitmap having the changed state, which may indicate that the data is ready to be transferred to the host device in the proper order.

According to one or more example embodiments of the present disclosure, the hardware module (e.g., the BITMAP circuit) may have a dynamically configurable data transfer trigger to improve or maximize bus utilization and/or efficiency. For example, in some embodiments, the sufficient number of consecutive bits that are used to automatically trigger the data transfer may be dynamically configured according to a suitable or desired threshold, such that a burst size of the data transfer may be variously changed. In this case, for example, the threshold may be set to minimize or reduce connection establishment overhead, for example, by ensuring that a suitable amount of data is ready for transmission before a connection is opened, and/or may minimize or reduce bus idle time, for example, by ensuring that the data is ready to be transferred before the connection is opened, but not such that an excessively large amount of data is transmitted over a single connection. For example, the threshold may be dynamically tuned at start-time, at run-time, and/or on a per command basis as needed or desired according to the performance, application, implementation, and/or the like of the storage device and/or the storage system. Accordingly, idle time on the data transfer bus may be reduced, half-duplex state connections may be reduced, and performance may be improved.

In some embodiments, the storage device includes the hardware module (e.g., the BITMAP circuit) to automatically trigger the data transfer, rather than using firmware or software. Using firmware or software to manage the data transfer may increase complexity, may be difficult to tune, and/or may be difficult to maintain. On the other hand, the hardware module according to some embodiments of the present disclosure may automatically trigger the data transfer according to the state of the bits of a corresponding bitmap, and the data transfer trigger may be dynamically configured as needed or desired. Further, the hardware module may increase parallelism, whereas using firmware or software may be more of a serial process. Accordingly, the hardware module (e.g., the BITMAP circuit) may improve performance and may increase flexibility of the storage device.

FIG. 1 is a system diagram of a storage system, according to one or more example embodiments of the present disclosure.

In brief overview, the storage system 100 according to one or more embodiments of the present disclosure may include a host device (e.g., a host computer) 102 and a storage device 104. The host device 102 may issue commands to the storage device 104, such that the storage device 104 retrieves data associated with the commands stored therein. For example, the host device 102 may be communicably connected to the storage device 104 (e.g., over a storage interface 110), and may issue a READ command to the storage device 104, such that data corresponding to the READ command is retrieved (e.g., READ) from the storage device 104 and transmitted to the host device 102. Once all of the data has been successfully transmitted to the host device 102, the storage device 104 may transmit an appropriate response to the host device 102, indicating that all of the data associated with the READ command has been successfully transmitted.

In one or more example embodiments, the storage device 104 may include a hardware module (e.g., a BITMAP circuit 118) to track out-of-order operation completions and to automatically trigger in-order DATA frame transmissions. For example, in some embodiments, the hardware module may include an array of bitmaps and ancillary logic. Each bitmap may include n bits (where n is a natural number) representing the data to be transferred for a single READ command. For example, each bit may represent one portion or chunk of data (e.g., a page of data) to be read from the storage device 102 (e.g., from storage memory 116). In other words, each bitmap may correspond to a mapping of bits for a single READ command, where each of the bits represents a read state of one portion or chunk of data corresponding to the single READ command. The hardware module may identify a bit number corresponding to an initial bit (e.g., a least significant bit) in a single burst of data to be transferred, and may set a size of the burst in bits. Once a suitable or desired number of consecutive bits (e.g., starting from the initial bit or the least significant bit) from among the bits of the corresponding bitmap have a changed state from an initial state, which may indicate that the data is ready to be transferred to the host device in the proper order, the hardware module may automatically trigger the data transfer to the host device 102.

In more detail, referring to FIG. 1, the host device 102 may include a host processor 106 and host memory 108. The host processor 106 may be a general purpose processor, for example, such as a central processing unit (CPU) core of the host device 102. The host memory 108 may be considered as high performing main memory (e.g., primary memory) of the host device 102. For example, in some embodiments, the host memory 108 may include (or may be) volatile memory, for example, such as dynamic random-access memory (DRAM). However, the present disclosure is not limited thereto, and the host memory 108 may include (or may be) any suitable high performing main memory (e.g., primary memory) replacement for the host device 102 as would be known to those skilled in the art. For example, in other embodiments, the host memory 108 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM) and can include, for example, chalcogenides, and/or the like.

The storage device 104 may be considered as secondary memory that may persistently store data accessible by the host device 102. In this context, the storage device 104 may include (or may be) relatively slower memory when compared to the high performing memory of the host memory 108. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 104 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 104 may conform to any suitable or desired derivative of these form factors. For convenience, the storage device 104 may be described hereinafter in the context of an SSD, but the present disclosure is not limited thereto.

The storage device 104 may be communicably connected to the host device 102 over a storage interface 110. The storage interface 110 may facilitate communications (e.g., using a connector and a protocol) between the host device 102 and the storage device 104. In some embodiments, the storage interface 110 may facilitate the exchange of storage requests and responses between the host device 102 and the storage device 104. In some embodiments, the storage interface 110 may facilitate data transfers by the storage device 104 to and from the host memory 108 of the host device 102. For example, in an embodiment, the storage interface 110 (e.g., the connector and the protocol thereof) may include (or may conform to) Small Computer System Interface (SCSI), Serial Attached SCSI (SAS), and/or the like. However, the present disclosure is not limited thereto, and in other embodiments, the storage interface 110 (e.g., the connector and protocol thereof) may conform to other suitable storage interfaces, for example, such as Peripheral Component Interconnect Express (PCIe), remote direct memory access (RDMA) over Ethernet, Serial Advanced Technology Attachment (SATA), Fiber Channel, Non Volatile Memory Express (NVMe), NVMe over Fabric (NVMe-oF), and/or the like. In other embodiments, the storage interface 110 (e.g., the connector and the protocol thereof) may include (or may conform to) various general-purpose interfaces, for example, such as Ethernet, Universal Serial Bus (USB), and/or the like. For convenience, the storage interface 110 may be described hereinafter in the context of a SAS interface, but the present disclosure is not limited thereto.

In some embodiments, the storage device 104 may include a host interface 112, a storage controller 114, and storage memory 116. The host interface 112 may be connected to the storage interface 110, and may respond to input/output (I/O) requests received from the host device 102 over the storage interface 110. For example, the host interface 112 may receive a command (e.g., a READ command) from the host device 102 over the storage interface 110, and may transmit the command to the storage controller 114 to retrieve data associated with the command from the storage memory 116. The storage controller 114 may provide an interface to control, and to provide access to and from, the storage memory 116. For example, the storage controller 114 may include at least one processing circuit embedded thereon for interfacing with the storage memory 116. The processing circuit may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 116 according to the data access instructions. For example, the data access instructions may include any suitable data storage and retrieval algorithm (e.g., READ/WRITE) instructions, and/or the like. The storage memory 116 may persistently store the data received from the host device 102 in a plurality of logical blocks. For example, in an embodiment, the storage memory 116 may include non-volatile memory, for example, such as NAND flash memory. However, the present disclosure is not limited thereto, and the storage memory 116 may include any suitable memory depending on a type of the storage device 104 (e.g., magnetic disks, tape, optical disks, and/or the like).

While the host interface 112 and the storage controller 114 are shown as being separate components of the storage device 104, the present disclosure is not limited thereto. For example, the host interface 112 and the storage controller 114 are shown as separate components to distinguish between a front end of the storage device 104, which receives commands from the host device 102, and a back end of the storage device 104, which retrieves (e.g., READ) the data associated with the commands from the storage memory 116. Accordingly, in various embodiments, the host interface 112 may be integrated with the storage controller 114 (e.g., as an integrated circuit (IC)), may be implemented separately from the storage controller 114 and attached to the storage device 104, for example, as a system on chip (SOC), or the like.

In one or more example embodiments, the storage device 104 may further include a BITMAP circuit 118 and a transfer circuit 120. The BITMAP circuit 118 may track out-of-order operation completions and may automatically trigger an in-order (e.g., a constrained order) DATA frame transmission. The transfer circuit 120 may receive the trigger (e.g., a trigger bit) from the BITMAP circuit 118 to transfer the data in a predetermined order to the host device 102 for a corresponding command. For example, in an embodiment, the BITMAP circuit 118 may include an array of bitmaps, and each of the bitmaps may correspond to a single host command. Each bit in the bitmap corresponding to the single host command may represent one portion or chunk of data (e.g., a page of data) to be read from the storage memory 116. For example, the portion or chunk of data may be the smallest unit of data that may be read from the storage memory 116 by one READ operation, such as a page of data. For a non-limiting example, if a single READ command requires 5 pages of data to be read from the storage memory 116 (e.g., from the logical blocks of the storage memory 116), 5 bits (e.g., 5 consecutive bits) in the corresponding bitmap may correspond to the 5 pages of data to be read from the storage memory 116. As each of the 5 pages of data are read from the storage memory 116 in any order, for example, as each corresponding READ operation completes in any order, a corresponding bit in the bitmap may be changed. Once each of the 5 bits are changed, the BITMAP circuit 118 may trigger a transfer of the data corresponding to the single READ command to the transfer circuit 120.

In some embodiments, the BITMAP circuit 118 may be implemented as a hardware module (e.g., an electronic circuit) that is communicably connected to the host interface 112 and the storage controller 114. For example, in an embodiment, the BITMAP circuit 118 may be implemented as an IC that is attached to (or mounted on) the storage device 104 (e.g., that may be embedded on the same board or the same circuit board as that of the storage device 104). For example, the BITMAP circuit 118 may be implemented on (e.g., may be attached to or mounted on) the storage device 104 SOC. However, the present disclosure is not limited thereto, for example, in another embodiment, the BITMAP circuit 118 may be implemented on a separate circuit board (e.g., a printed circuit board PCB) from that of the storage device 104, and may be communicably connected to the storage device 104.

While the transfer circuit 120 is shown as being a separate component of the storage device 104, the present disclosure is not limited thereto. For example, the transfer circuit 120 is shown as a separate component to distinguish the transfer of the data from the triggering of the transfer. Accordingly, in various embodiments, the transfer circuit 120 to may be implemented as a part of the host interface 112 and/or as a part of the BITMAP circuit 118, for example.

Figure 2:
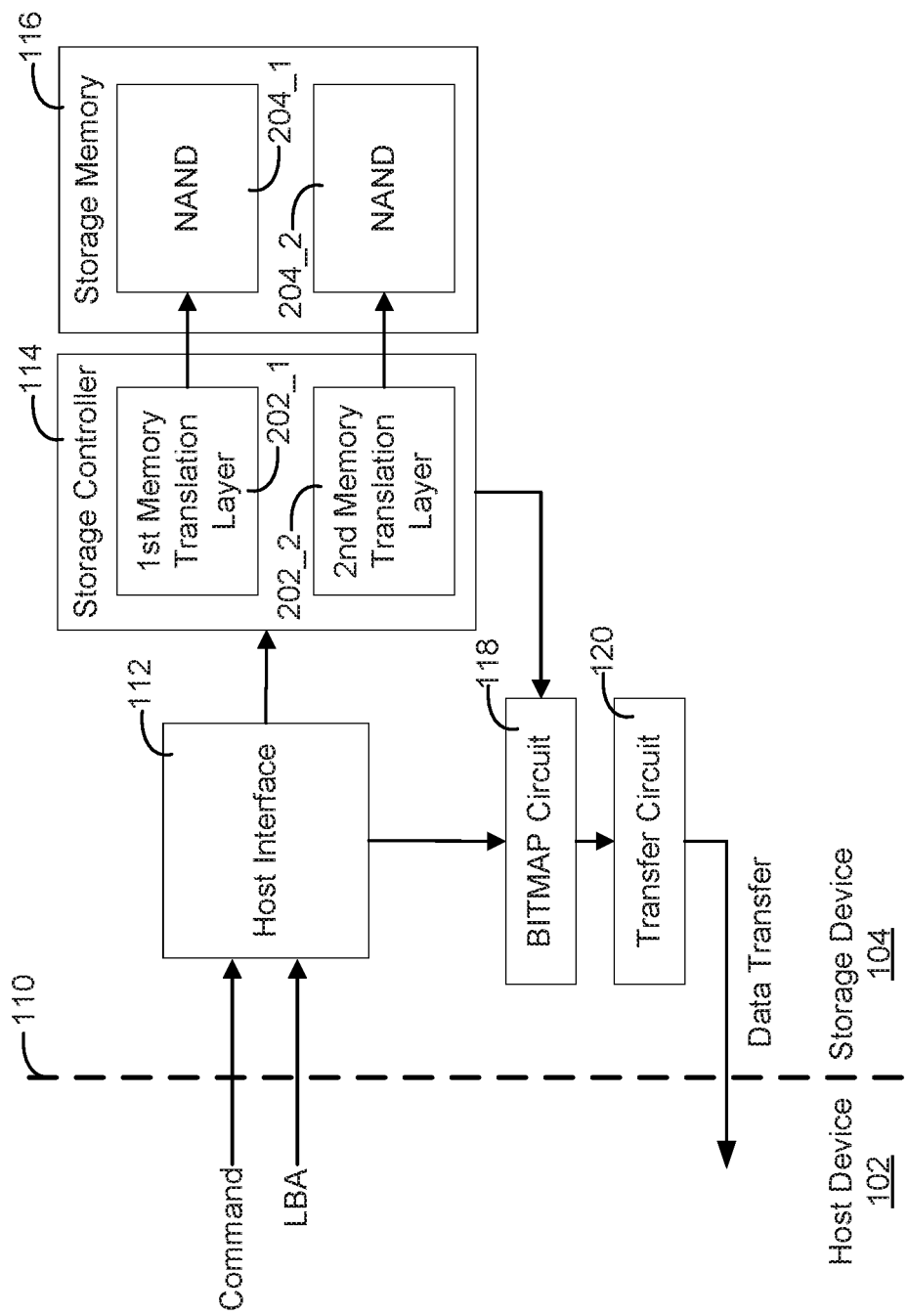
FIG. 2 is a block diagram of a storage device, according to one or more example embodiments of the present disclosure.

FIG. 2 is a block diagram of a storage device, according to one or more example embodiments of the present disclosure.

In brief overview, the host device 102 may transmit a command to the storage device 104 over the storage interface 110. The command may include an LBA, such that the storage device 104 executes the command on data stored in the storage memory 116 (e.g., in one or more logical blocks thereof) according to the LBA. For example, the LBA may include a starting LBA and an LBA count. The storage device 104 may execute the command by performing multiple operations, and the operations may be completed in any order according to a workload of the storage device 104. Once a suitable number of the operations are completed, the storage device 104 may transfer the data to the host device 102 corresponding to the command in a proper order (e.g., a predetermined order or a particular order), for example, from a lowest LBA to a highest LBA.

In more detail, referring to FIG. 2, the host interface 112 may receive the command from the host device 102 over the storage interface 110. For example, the command may be a READ command, but the present disclosure is not limited thereto. The host interface 112 may transmit the command to the storage controller 114 to execute one or more operations associated with the command, and may assign a bitmap in the BITMAP circuit 118 for the command. The storage controller 114 may execute the one or more operations associated with the command in any order according to a workload, and may change a state of each of the bits in the assigned bitmap as each of the operations are completed.

For example, the storage controller 114 may include one or more memory translation layers 202_1 and 202_2 (e.g., Flash memory translation layers), which may be generally referred to as memory translation layers 202, and each of the memory translation layers 202 may be connected to one or more NAND die 204_1 and 204_2 of the storage memory 116. In this case, the data associated with the command may be stored in any one or more of the NAND die 204_1 and 204_2, such that any one or more of the memory translation layers 202 may perform the operations associated with the READ command to retrieve the portions or chunks of data (e.g., the pages of data) from their respective NAND die. Each of the memory translation layers 202 may include a queue of any number of operations for its respective one or more NAND die, such that the one or more operations associated with the command may be completed in any order according to the queues of the memory translation layers 202. Accordingly, the one or more operations associated with the READ command may be completed in any order, such that the portions or chunks of data associated with the command may be read from the NAND die 204_1 and 204_2 in any order.

The BITMAP circuit 118 may track a state of the bits in the assigned bitmap, and may trigger an automatic data transfer in response to a sufficient number of bits (e.g., a sufficient number of consecutive bits) starting from an initial bit (e.g., a least significant bit) having a changed state. For example, the assigned bitmap may have a plurality of consecutive bits, and each bit may correspond to an operation from among the plurality of operations associated with the command. In this case, because the operations may be completed out of order, the bits in the assigned bitmap may be changed out of order corresponding to the out-of-order operation completions. Accordingly, the consecutive bits may correspond to a predetermined order of the portions or chunks of data to be transmitted to the host device 102, such that the sufficient number of consecutive bits starting from the initial bit having the changed state may indicate that the data is ready to be transferred to the host device in a proper order (e.g., in a predetermined order).

For a non-limiting example, when a READ command requires 3 pages of data to be read from the NAND die 204_1 and 204_2 to be transmitted to the host device 102 in a predetermined order from a first page, a second page, and a third page, three consecutive bits may be specified in the assigned bitmap to correspond to the 3 pages of data. In this case, an initial bit (e.g., a least significant bit) from among the three consecutive bits may correspond to the first page, a next bit from among the three consecutive bits may correspond to the second page, and a last bit from among the three consecutive bits may correspond to the third page, such that the predetermined order of the 3 pages of data may be maintained according to the order of the bits. Because the 3 pages of data may be read from the NAND die 204_1 and 204_2 in any order, the storage controller 114 may change the state of the 3 bits in the assigned bitmap in any order. However, because the data may be transmitted to the host device 102 in the predetermined order, the transfer of the data may not be triggered until at least the initial bit (or some configurable number of consecutive bits starting from the initial bit) has the changed state, indicating that the corresponding page of data has been received.

In some embodiments, the BITMAP circuit 118 may have a configurable data transfer trigger to control a burst size of the data to be transferred to the host device 102. For example, the BITMAP circuit 118 may have a configurable threshold to set the suitable number of bits starting from the initial bit that may have the changed state before triggering the data transfer. The threshold may be dynamically tuned to improve performance of the storage device 104. For example, the threshold may be dynamically tuned to reduce connection establishment overhead, to reduce idle time on the data transfer bus, to reduce half-duplex state connections, and/or the like. Accordingly, performance may be improved by dynamically tuning the threshold as need or desired. The BITMAP circuit 118 may track the state of each of the bits in the assigned bitmap for the single command, and once the suitable number of bits starting from the initial bit in the assigned bitmap has the changed state, the BITMAP circuit 118 may trigger the transfer circuit 120 to transfer the data to the host device in the predetermined order for a single burst.

Figure 3:
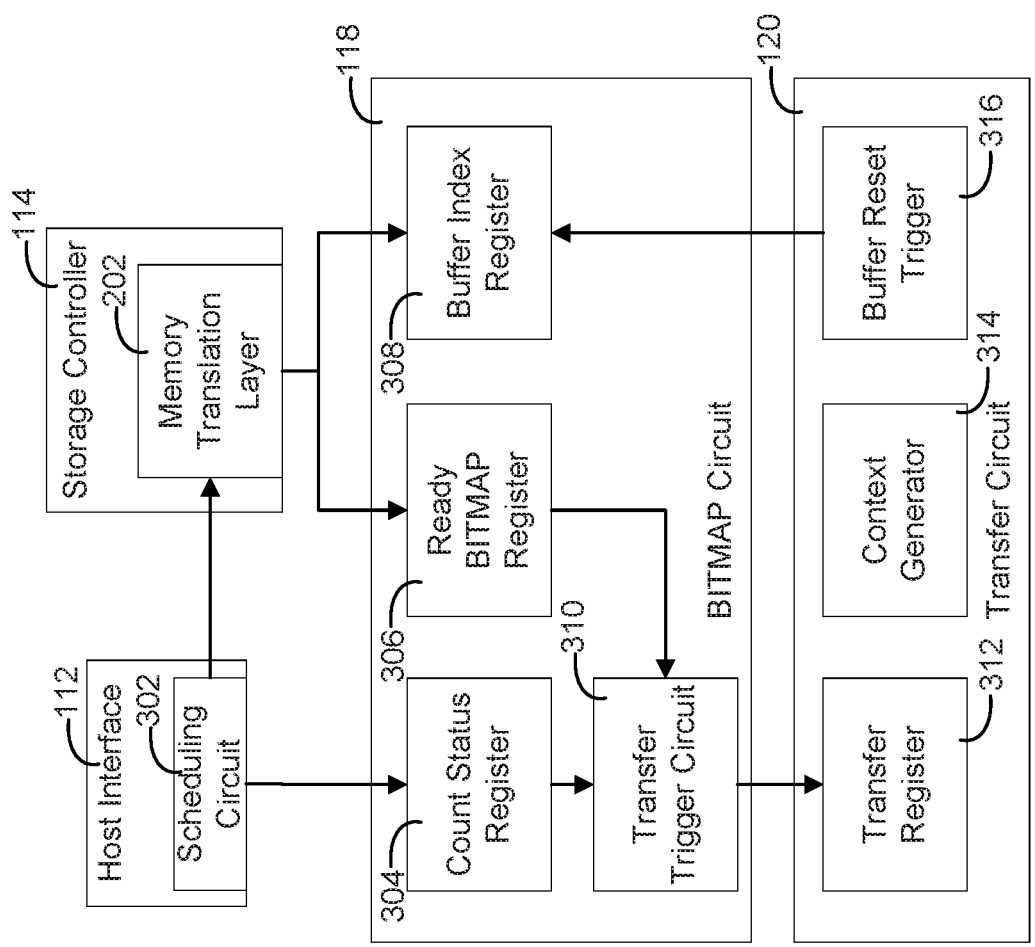
FIG. 3 is a block diagram of a storage device in more detail, according to one or more example embodiments of the present disclosure.

FIG. 3 is a block diagram of a storage device in more detail, according to one or more example embodiments of the present disclosure.

Referring to FIG. 3, in some embodiments, the host interface 112 may include a scheduling circuit 302. The host interface 112 may receive a host command from the host device 102, and the scheduling circuit 302 may issue requests to the storage controller 114 to execute one or more operations associated with the host command. For example, when the host command is a READ command, the scheduling circuit 302 may issue READ requests to the storage controller 114 to execute one or more READ operations associated with the READ command, such that each of the READ operations retrieves a portion or chunk of data (e.g., a page of data) associated with the READ command from the storage memory 116.

In some embodiments, the scheduling circuit 302 may identify multiple pages of data that may be read in order to execute a single READ command, and may issue READ requests to the storage controller 114 to retrieve the multiple pages of data in threshold size chunks corresponding to a single transfer burst from the storage memory 116 (e.g., from the NAND die 204_1 and 204_2). For example, in some embodiments, the scheduling circuit 302 may generate a data structure (e.g., a Direct Memory Access (DMA) Descriptor) DD for each page to be read, and may transmit a DD index corresponding to the data structure DD to the storage controller 114 to read the corresponding page of data from the storage memory 116 (e.g., from the NAND die 204_1 and 204_2). In some embodiments, the scheduling circuit 302 may transmit multiple read requests (e.g., multiple DD indexes) to the storage controller 114 in the threshold size chunks to satisfy a single transfer burst size, such that a corresponding threshold number of pages are read from the storage memory 116 at a time. For example, if the threshold is set to 8, such that 8 consecutive pages of data are transferred to the host device 102 at a time, the scheduling circuit 302 may generate the data structure DD for each of the 8 pages, and may transmit the corresponding DD indexes for the 8 pages to the storage controller 114 to read the 8 pages of data from the storage memory 116.

In some embodiments, the scheduling circuit 112 may issue a set of READ requests to the storage controller 114 to read pages of data ahead of a previous data transfer completion. For example, once a threshold size chunk of the data associated with the READ request is ready to be transmitted to the host device 102, the scheduling circuit 302 may issue a next set of READ requests to the storage controller 114 to read a next threshold size chunk of data from the storage memory 116. In this case, the next set of READ requests may be for the same READ command, or for a different command. For a non-limiting example, a single READ command may require 15 READ operations to retrieve 15 pages of data from the storage memory 116, and the threshold may be set to 8 such that once 8 consecutive bits of the assigned bitmap starting from the initial bit corresponding to the first 8 pages has the changed state, the first 8 pages may be transferred to the host device 102 at a time (e.g., during one open connection). In this case, as the first 8 pages are being transferred to the host device 102, the scheduling circuit 302 may issue the next 7 read requests to the storage controller 114 in parallel to retrieve the next 7 pages to be transferred to the host device 102 during a next transfer burst. Accordingly, parallelism may be improved, which may lead to better performance.

In some embodiments, the scheduling circuit 302 may extend a single transfer burst to include more pages of data in the single transfer burst, for example, when more consecutive pages of data for the single host command are ready to be transmitted at the end of the single transfer burst. Returning to our example of the 15 pages of data, in some embodiments, as the last page (e.g., the $8^{th}$ page) of data is being transferred to the host device 102 in a first transfer burst, if a first page (e.g., the $9^{th}$ page) of data is ready to be transferred for a second transfer burst, the scheduling circuit 302 may extend the first transfer burst to include the first page (e.g., the $9^{th}$ page) of data of the second transfer burst. Accordingly, connection establishment overhead may be reduced.

In some embodiments, the scheduling circuit 302 may assign a bitmap in the BITMAP circuit 118 for each host command, such that the BITMAP circuit 118 may track out-of-order READ operation completions for each host command. For example, in some embodiments, the scheduling circuit 302 may assign a bitmap to a single host command, and may set a relative start position (e.g., indicating the position of the initial bit) of the data transfer in the bitmap for the single host command, as well as a count value of the number of bits in the bitmap that may have the changed state to trigger the in-order (e.g., the constrained order) data transfer. For example, the count value may correspond to a number of READ requests issued to the storage controller 114 for a single transfer burst, such that the count value determines the transfer burst size (e.g., the data transfer threshold size) in bits. Accordingly, in some embodiments, the count value and the relative start position may be dynamically set to control the threshold size corresponding to the number of suitable bits that may have the changed state in order to trigger the data transfer. In an embodiment, the corresponding bits in the corresponding bitmap may be initially set to the initial state, which may be initialized at power on, for example.

While the scheduling circuit 302 is shown as being a part of the host interface 112, the present disclosure is not limited thereto. For example, in various embodiments, the scheduling circuit 302 may be implemented as a separate circuit (e.g., electronic circuit) that is connected to the host interface 112 and the storage controller 114, may be implemented as part of the storage controller 114, may be implemented as a part of the host interface 112 and as a part of the storage controller 114, or the like. In another embodiment, the scheduling circuit 302 may be implemented in firmware or software, for example, as part of the host interface 112 and/or as part of the storage controller 114.

In some embodiments, as the READ requests are completed by the storage controller 114 (e.g., by the memory translation layers 202), the storage controller 114 (or the corresponding memory translation layer 202) may change the corresponding bits in the bitmap to have the changed state, indicating that a corresponding page of data has been read. For example, in some embodiments, the storage controller 114 (or the corresponding memory translation layer 202) may provide a ready index to the BITMAP circuit 118, indicating that a page of data corresponding to a particular data structure DD (e.g., a particular bit in the bitmap) is now available. In some embodiments, the portions or chunks of data (e.g., the page data) read from the storage memory 116 may be stored in a buffer, such that the transfer circuit 120 may transmit the data to the host device 102 from the buffer. In this case, the storage controller 114 (or the corresponding memory translation layer 202) may further transmit a buffer index to the BITMAP circuit 118, indicating a location of the page of data for the data transfer.

The BITMAP circuit 118 may monitor specified bits (e.g., the threshold number of bits starting from the initial bit) of the bitmaps currently in use (e.g., the bitmaps currently assigned to host commands), and may detect a bitmap in which the specified bits have the changed state. When the BITMAP circuit 118 detects a bitmap in which the specified bits have the changed state, the BITMAP circuit 118 may trigger the transfer circuit 120 to transfer the corresponding data in the predetermined order, and may initialize the bits in the bitmap to their initial state to be used by a subsequent transfer or a subsequent command. In an embodiment, if the scheduling circuit 302 issues a set of READ requests to the storage controller 114 to read pages of data ahead of a previous data transfer completion, the storage controller 114 may change bit states in advance of the subsequent data transfer being specified, such that once the next data transfer is specified, the data may already be available such that the next data transfer may be immediately triggered once the previous data transfer is completed.

For example, in some embodiments, the BITMAP circuit 118 may include a count status register 304, a ready BITMAP register 306, a buffer index register 308, and a transfer trigger circuit 310. In an embodiment, the count status register 304 may be set by the scheduling circuit 302 to assign a bitmap for a host command. In an embodiment, the count status register 304 may be a 2D array, with each row representing a data transfer index (TR index) corresponding to a single host command. For example, each row may include the count value corresponding to the threshold number of bits that may be set before triggering a corresponding data transfer for the single host command, and a relative start index of the bits, indicating the relative start position of the initial bit in the assigned bitmap.

In an embodiment, the ready BITMAP register 306 may be set according to the ready indexes provided by the storage controller 114 (or a corresponding memory translation layer 202) to change the bits in the corresponding bitmaps as the READ operations are completed. For example, in an embodiment, the ready BITMAP register 306 may be a 2D array with each row corresponding to a particular TR index (e.g., a particular host command). Each row may include a bitmap (e.g., a 64-bit bitmap) including a plurality of bits corresponding to a maximum number of READ requests that may be generated by the scheduling circuit 302 for a single transfer burst. Whenever the storage controller 114 provides a ready index (e.g., by writing the ready index in a special function register (SFR)), the BITMAP circuit 118 may change a state of a corresponding bit in a corresponding bitmap (e.g., according to the TR index), indicating that the corresponding portion or chunk of data (e.g., a page of data) for that bit is ready for transmission.

In some embodiments, the buffer index register 308 may be set by the storage controller 114 (or a corresponding memory translation layer 202), indicating a location of the data that is ready for transmission. For example, as the storage controller 114 reads a particular portion or chunk of data (e.g., a page of data) from the storage memory 116, the read data may be stored in a buffer to be retrieved during a corresponding data transfer. Accordingly, in some embodiments, the buffer index register 308 may include a buffer index to indicate the location of the data to be transferred during a corresponding data transfer.

In some embodiments, the transfer trigger circuit 310 may determine whether a suitable number of bits (e.g., consecutive bits) in a corresponding bitmap of the ready BITMAP register 306 has the changed state, indicating that the data corresponding to the bits are ready to be transferred. For example, in some embodiments, the transfer trigger circuit 310 may monitor specified bits (e.g., identified based on the relative start position and count value) of the bitmaps currently in use (e.g., the bitmaps currently assigned to host commands), and may detect a bitmap in which the specified bits (e.g., the threshold number of bits) have the changed state. In response to detecting a bitmap having the specified bits with the changed state, the transfer trigger circuit 310 may automatically trigger a transfer of the data corresponding to the bitmap. For example, in some embodiments, the transfer trigger circuit 310 may set a trigger bit (e.g., according to the TR index) corresponding to the assigned bitmap to the transfer circuit 120 to trigger the corresponding data transfer. The transfer trigger circuit 310 will be described in more detail below with reference to FIGS. 4-7.

The transfer circuit 120 may transfer the data for a corresponding host command to the host device 102 according to the trigger (e.g., the trigger bit) from the BITMAP circuit 118. For example, the transfer circuit 120 may include a transfer register 312, a context generator 314, and a buffer reset trigger 316. The transfer register 312 may be an SFR including a trigger bitmap that is used to initiate the data transfer when a corresponding bit (e.g., a trigger bit) in the trigger bitmap is set according to a corresponding TR index received from the transfer trigger circuit 310. The context generator may order the data corresponding to the bitmap in the predetermined order to initiate the transfer of the data in the predetermined order to the host device 102. Upon successful transfer of the data, the buffer reset trigger 316 may release (e.g., may reset) the buffer for the transferred data, such that the buffer may be used for subsequent transfers.

Figure 4:
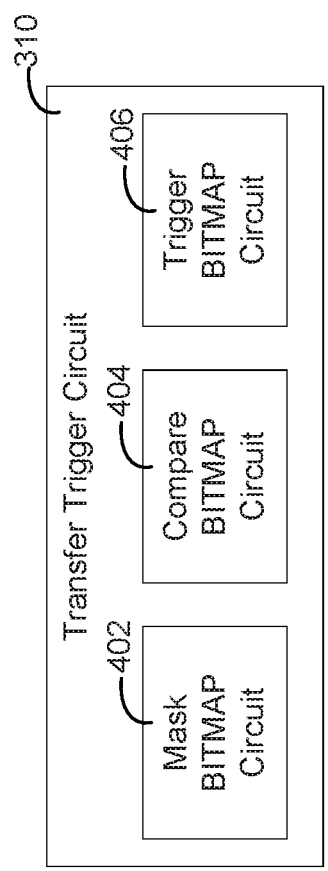
FIG. 4 is a block diagram of a transfer trigger circuit, according to one or more example embodiments of the present disclosure.
Figure 5:
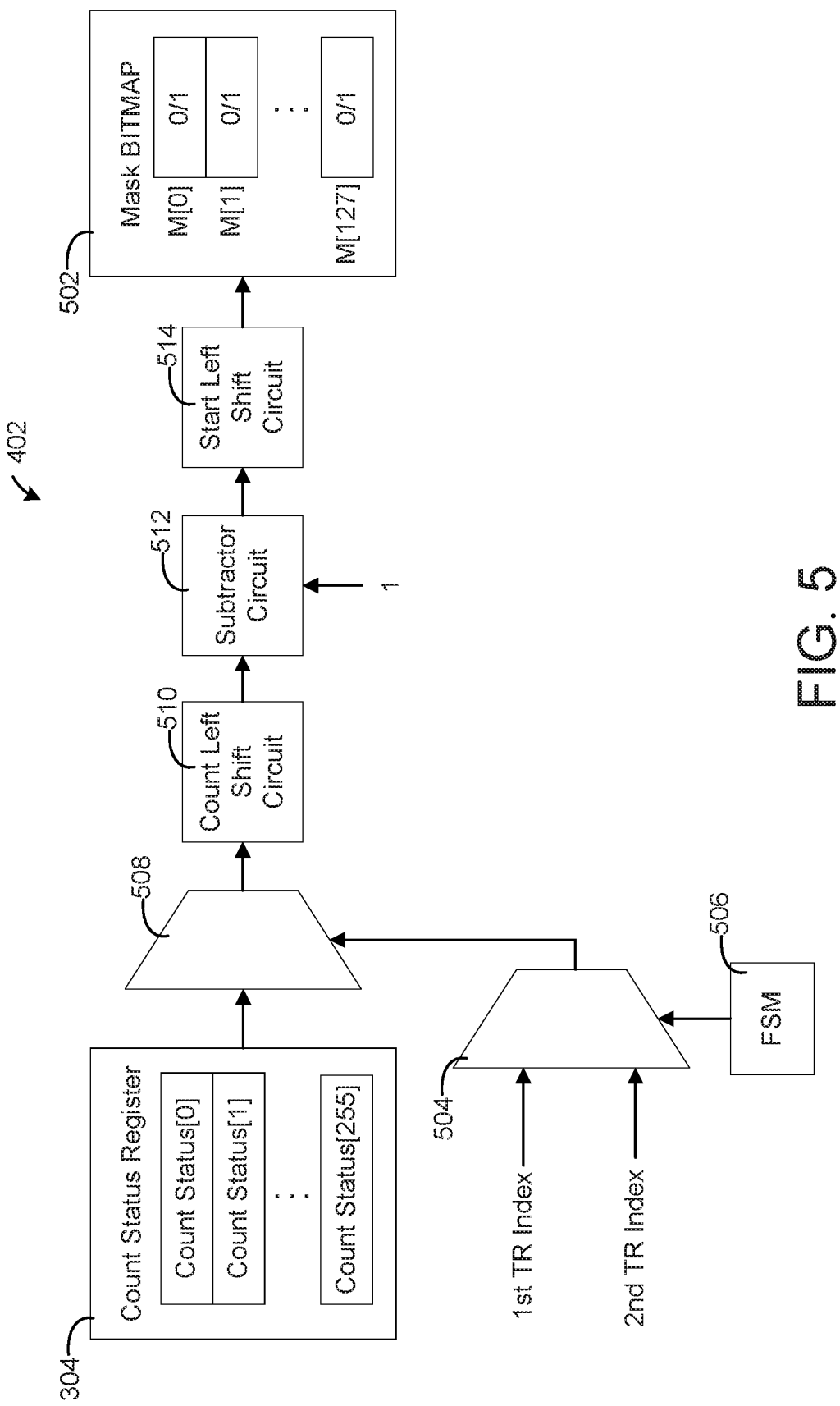
FIG. 5 is a schematic circuit diagram illustrating a mask BITMAP circuit, according to one or more example embodiments of the present disclosure.
Figure 6:
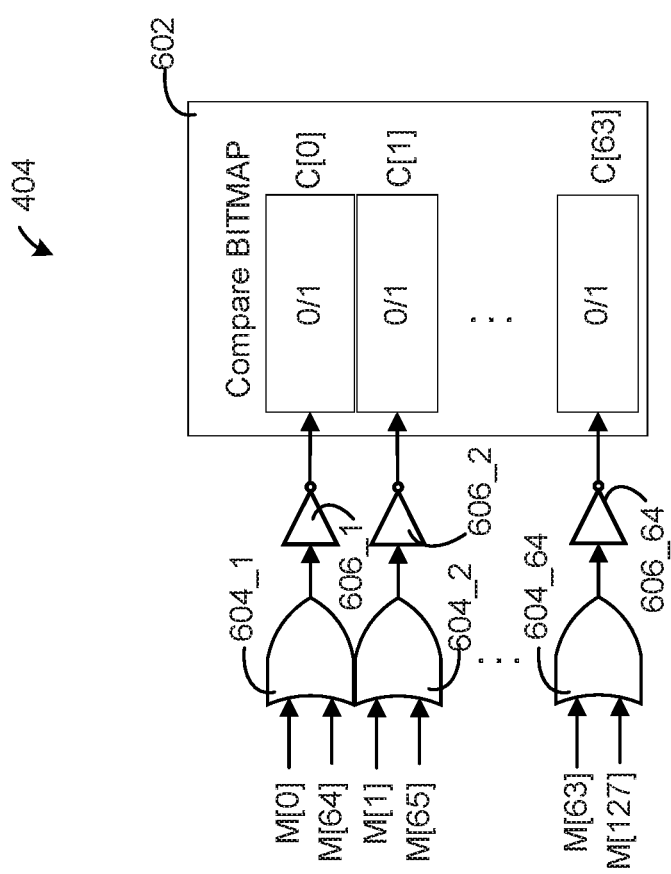
FIG. 6 is a schematic circuit diagram illustrating a compare BITMAP circuit, according to one or more example embodiments of the present disclosure.
Figure 7:
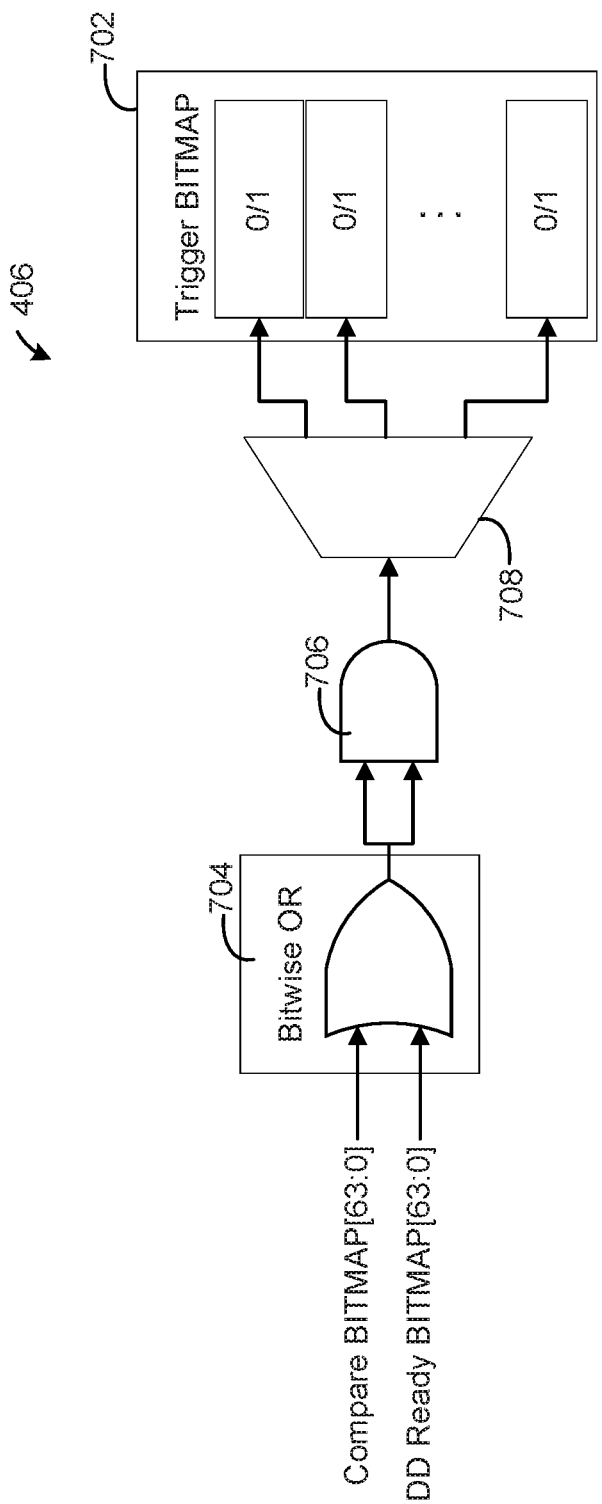
FIG. 7 is a schematic circuit diagram illustrating a trigger BITMAP circuit, according to one or more example embodiments of the present disclosure.

FIG. 4 is a block diagram of a transfer trigger circuit, according to one or more example embodiments of the present disclosure. FIG. 5 is a schematic circuit diagram illustrating a mask BITMAP circuit, according to one or more example embodiments of the present disclosure. FIG. 6 is a schematic circuit diagram illustrating a compare BITMAP circuit, according to one or more example embodiments of the present disclosure. FIG. 7 is a schematic circuit diagram illustrating a trigger BITMAP circuit, according to one or more example embodiments of the present disclosure.

Referring to FIG. 4, the transfer trigger circuit 310 may include the mask BITMAP circuit 402, the compare BITMAP circuit 404, and the trigger BITMAP circuit 406. In brief overview, the mask BITMAP circuit 402 may convert the count value and the relative start position in the count status register 304 for a particular host command (e.g., for a particular TR index) to generate a mask BITMAP representing the count value relative to the relative start position in bits. The compare BITMAP circuit 404 may generate a compare BITMAP according to the mask BITMAP, which may be used to compare the count value with the specified bits in a corresponding bitmap of the ready BITMAP register 306 having the changed state. The trigger BITMAP circuit 406 may compare the compare BITMAP with the corresponding bitmap (e.g., a corresponding DD Ready bitmap) to generate a trigger bit to automatically trigger the data transfer.

In more detail, referring to FIG. 5, in some embodiments, the mask BITMAP circuit 402 may generate a mask BITMAP 502 according to the count value and the relative start position (e.g., a relative start index) stored in a particular row of the count status register 304. In some embodiments, the mask BITMAP 502 may be used to handle wrap up conditions. For example, in an embodiment, if the bitmaps in the ready BITMAP register 306 are 64-bit bitmaps, and a corresponding count value is 64 with a corresponding relative start index being 63, the mask BITMAP 502 may be a 128-bit BITMAP. In this case, when a compare BITMAP is generated according to the mask BITMAP, the compare BITMAP may be generated as a 64-bit bitmap such that it may be compared with the corresponding 64-bit bitmap (e.g., the corresponding DD Ready bitmap) in the ready BITMAP register 306. In some embodiments, the compare BITMAP may be generated, for example, by a bitwise ORing of the upper and lower 64 bits of the mask BITMAP followed by negation. For example, the 63$^{rd}$ bit in the mask BITMAP 502 may be set to an initial bit (e.g., the 0$^{th}$ bit or the least significant bit) of the corresponding compare BITMAP with a suitable number of consecutive bits starting from the initial bit corresponding to the other bits of the specified bits (e.g., the threshold number of bits).

In some embodiments, the mask BITMAP circuit 402 may select one of the rows of the count status register 304 according to a TR index received from any one of the scheduling circuit 302 or the storage controller 114. For example, because the scheduling circuit 302 and the storage controller 114 perform separate processes, a TR index may be received from any one of the scheduling circuit 302 or the storage controller 114 in any order. The scheduling circuit 302 may provide a TR index, for example, when assigning a bitmap for a host command as discussed above. For example, the scheduling circuit 302 may provide the TR index to assign a bitmap to a new host command, to set a threshold (e.g., a count value and/or the relative start position) for a next transfer of data associated with an existing host command, to assign a bitmap for one or more read-ahead requests, to extend a burst size for a data transfer corresponding to particular host command, and/or the like. The storage controller 114 may provide a TR index, for example, when a ready index is provided, such that a corresponding bitmap in the ready BITMAP register 306 may be compared to determine whether a suitable number of bits in the corresponding bitmap have the changed state.

For example, in some embodiments, the mask BITMAP circuit 402 may include a first multiplexer (MUX) 504, a finite state machine (FSM) 506, a second MUX 508, a count left shift circuit 510, a subtractor circuit 512, and a start left shift circuit 514. The first MUX 504 may select one of the 1st TR Index (e.g., supplied by the scheduling circuit 302) or the 2nd TR Index (e.g., supplied by the storage controller 114) as a selection signal to the second MUX 508. In some embodiments, the first MUX 504 may select one of the 1st TR Index and the 2nd TR Index according to an arbitration signal provided by the FSM 506. For example, because the 1st TR Index and the 2nd TR Index may be received in any order as discussed above, the arbitration signal may be provided, for example, to handle situation when both are received at the same time or substantially at the same time. In this case, the arbitration signal may be controlled according to a state of the FSM 506. For example, in an embodiment, because the storage controller 114 may work on SFR write, the storage controller 114 may be given a higher priority than the scheduling circuit 302.

Still referring to FIG. 5, in some embodiments, the second MUX 508 may select a row from among the rows in the count status register 304 according to the first TR index or the second TR index. As discussed above, each of the rows in the count status register 304 may include a count value and a relative start position for the bits in a corresponding bitmap, which may be retrieved according to the TR index. The count left shift circuit 510 may convert a number of the count value to a bitmap. For example, the count left shift circuit 510 may generate an array of bits having a value of a 1 followed by the count value number of 0s (e.g., 1«count value). For a non-limiting example, assuming that the count value is 5, the count left shift circuit 510 may generate the array of bits having a value of "100000" (e.g., 1«5="100000").

The subtractor circuit 512 may convert the output of the count left circuit 410 to generate a number of bits corresponding to the count value having a bit value of 1. For example, the subtractor circuit 512 may subtract a value of 1 from the output of the count left shift circuit 510 (e.g., 1«count value−1). Returning to the non-limiting example of the count value of 5, the subtractor circuit 512 may subtract a 1 from the "100000" output from the count left shift circuit 510, such that the subtractor circuit generates a bitmap having a number of consecutive bits corresponding to the count value having bit values of 1 (e.g., 100000−1="11111").

The start left shift circuit 514 may convert the output of the subtractor circuit according to the relative start position to generate the mask BITMAP 502. For example, the start left shift circuit 514 may left shift the output of the subtractor circuit 512 by a number of the relative start position. Returning to the non-limiting example of the count value of 5, if the relative start position is 0, the start left shift circuit 514 may left shift the output of the subtractor circuit 512 (e.g., "11111") by the relative start position of 0 (e.g., 11111«=11111).

Referring to FIG. 6, in some embodiments, the compare BITMAP circuit 404 may generate a compare BITMAP 602 according to the mask BITMAP 502 to be compared with an assigned bitmap of the ready BITMAP register 306. For example, in some embodiments, the compare BITMAP circuit 404 may include a plurality of logic gates 604 and a plurality of inverters 606. For example, in some embodiments, each of the plurality of logic gates 604 may be an OR gate to perform a 2-bit OR operation between the upper bits and the lower bits of the mask BITMAP 502. In this case, for example, a first OR gate 604_1 may perform an OR operation between a first bit M[0] and a 65$^{th}$ bit M[64] of the mask BITMAP 502, a second OR gate 604_2 may perform an OR operation between a 2nd bit M[1] and a $66^{th}$ bit M[65] of the mask BITMAP 502, and so on and so forth, such that a $64^{th}$ OR gate 604_64 performs an OR operation between a $64^{th}$ bit M[63] and a $128^{th}$ bit M[127] of the mask BITMAP 502. Accordingly, the OR gates 604 may remove the wrap up condition as discussed above. The output of each of the OR gates 604 may be inverted by a corresponding one of the inverters 606. Accordingly, the compare BITMAP 602 may be generated to have all bit values of 1, except for those specified bits corresponding to the portions or chunks of data (e.g., the pages of data) to be read by the storage controller 114 (or a corresponding memory translation layer 202), which may be generated to have bit values of 0.

Referring to FIG. 7, in some embodiments, the trigger BITMAP circuit 406 may compare the compare BITMAP 602 with the assigned bitmap of the ready BITMAP register 306 to generate a trigger bit to trigger the data transfer. For example, as discussed above, whenever the storage controller 114 (or a corresponding memory translation layer 202) transmits a ready index (e.g., by writing the ready index in the SFR) corresponding to a page of data read from the storage memory 116, a state of a corresponding bit in the assigned bitmap of the ready BITMAP register 306 may be set to have the changed state. The trigger BITMAP circuit 406 may compare the bits in the corresponding bitmap of the ready BITMAP register 306 with the bits in the compare BITMAP 602 to determine whether the specified bits corresponding to the portions or chunks of data (e.g., the pages of data) to be read by the storage controller 114 (or a corresponding memory translation layer 202) of the assigned bitmap of the ready BITMAP register 306 has the changed state.

For example, in some embodiments, the trigger BITMAP circuit 406 may include a bitwise OR circuit 704, a reduction AND gate 706, and a demultiplexer (DMUX) 708. The bitwise OR circuit 704 may perform a bitwise OR operation between the bits of the compare BITMAP 602 and the bits of the assigned bitmap of the ready BITMAP register 306. The reduction AND gate 706 may perform an AND operation on the outputs of the bitwise OR circuit 704, and may output a 1 if each of the outputs of the bitwise OR circuit 704 has a value of 1, which may indicate that all of the ready indexes have been received, or may otherwise output a 0 if any of the outputs of the bitwise OR circuit is a 0. For example, because the compare BITMAP 602 may have all bit values of 1, except for those specified bits corresponding to the portions or chunks of data (e.g., the pages of data) to be read by the storage controller 114 (or a corresponding memory translation layer 202), which may have values of 0, the bitwise OR circuit 704 may output all 1s if all of the specified bits in the assigned bitmap of the ready BITMAP register 306 has a changed state (e.g., a value of 1), indicating that all of the ready indexes have been received. On the other hand, if any of the specified bits in the assigned bitmap still have the initial state (e.g., the bit value of 0), the bitwise OR circuit 704 may output a 0 for those bit comparisons. Accordingly, the reduction AND gate 706 may output a 1 if all of the ready indexes have been received (which sets the corresponding bits in the ready BITMAP register 306 to have a value of 1), or may otherwise output a 0 if at least one of the specified bits still have the initial state (e.g., indicating that a ready index for that bit has not yet been received).

The DMUX 708 may assign the output from the reduction AND gate 706 to a corresponding bit in the trigger BITMAP 702. The corresponding bit in the trigger BITMAP 702 may be selected according to the TR Index (e.g., the 1st TR index or the 2nd TR index selected by the arbitration signal), and if the corresponding bit is set to a 1 (e.g., according to a 1 output by the AND gate 706), a corresponding bit in the trigger BITMAP 702 (e.g., identified based on the TR index) may be set to a 1 to automatically trigger the trigger transfer circuit 310 to initiate the in-order (e.g., the constrained order) data transfer for the corresponding host command. Accordingly, the data transfer may be automatically triggered according to a state of the specified bits in the assigned bitmap of the ready BITMAP register 306.

Figure 8:
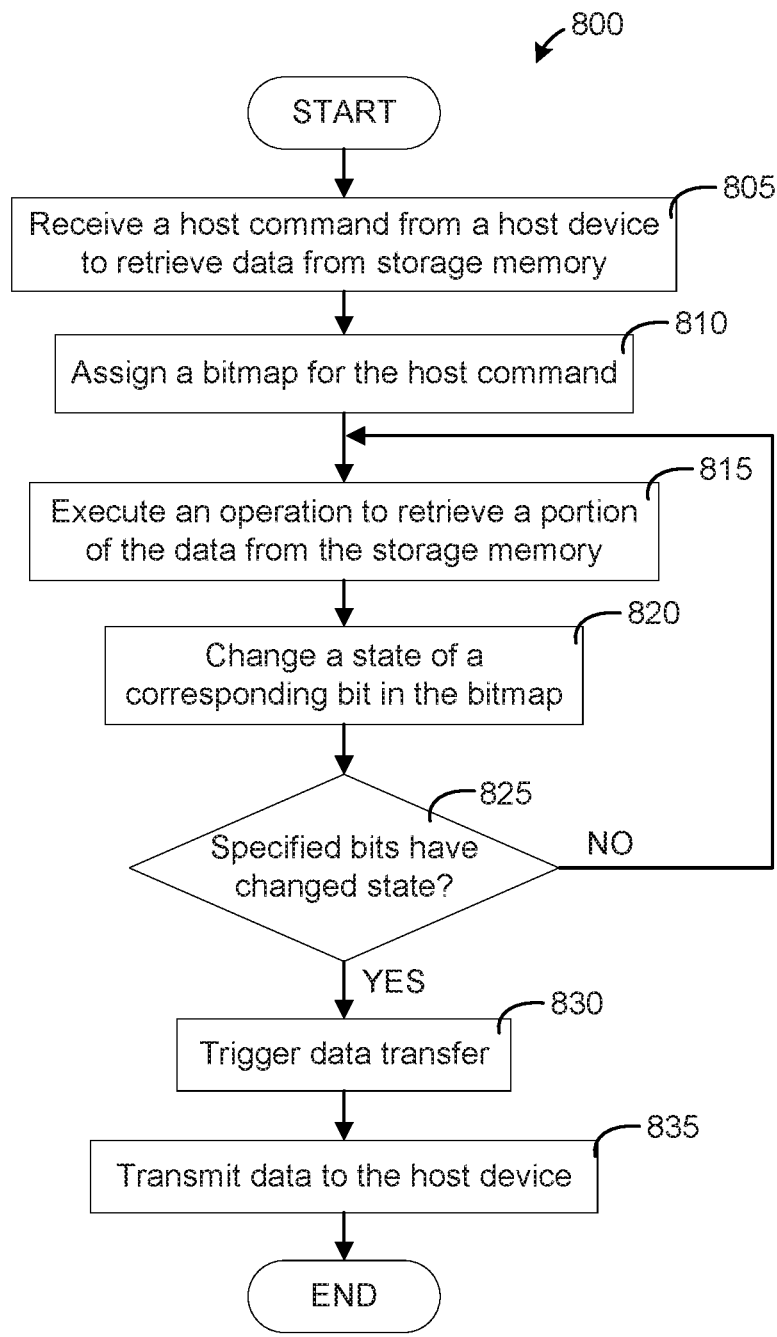
FIG. 8 is a flow diagram of a method for triggering a data transfer, according to one or more example embodiments of the present disclosure.

FIG. 8 is a flow diagram of a method for triggering a data transfer, according to one or more example embodiments of the present disclosure. However, the present disclosure is not limited to the sequence or number of the operations of the method 800 shown in FIG. 8, and can be altered into any desired sequence or number of operations as recognized by a person having ordinary skill in the art. For example, in some embodiments, the order may vary, or the method may include fewer or additional operations. Further, the operations shown in the method 800 may be performed by any suitable one of the components or any suitable combination of the components of those of one or more example embodiments described above.

Referring to FIG. 8, the method 800 starts, and a host command may be received from a host device to retrieve data from storage memory at operation 805. For example, in some embodiments, the host command may be a READ command, but the present disclosure is not limited thereto. The host command may be received by the storage device from the host device over a storage interface. For example, in some embodiments, the host interface 112 may receive the host command from the host device 102 over the storage interface 110.

In some embodiments, a bitmap may be assigned for the host command at operation 810. For example, in some embodiments, the host interface 112 or the scheduling circuit 302 may transmit one or more requests to the storage controller 114 to execute one or more operations in order to retrieve one or more portions or chunks of data (e.g., pages of data) associated with the host command from storage memory 116 (e.g., from one or more logical blocks of the storage memory 116). In this case, the host interface 112 or the scheduling circuit 302 may assign a bitmap (e.g., of the ready BITMAP register 306) to the host command (e.g., according to a TR index), and may transmit one or more data structures (e.g., DMA descriptors) DD to the storage controller 114 to execute the one or more operations according to the one or more data structures DD. In some embodiments, the host interface 112 or the scheduling circuit 302 may provide a count value (e.g., corresponding to the number of requests issued to the storage controller 114), and a relative start index (corresponding to an initial bit) for the bits in the assigned bitmap, such that specified bits in the assigned bitmap may be identified according to the number of requests (or the number of data structures DD) issued to the storage controller.

In some embodiments, an operation from among the one or more operations may be executed to retrieve a portion or chunk of data from the storage memory at operation 815. For example, the storage controller 114 (or a corresponding one of the memory translation layers 202) may execute an operation from among the one or more operations according to a request (or a data structure DD) from among the one or more requests. In some embodiments, a state of a corresponding bit (e.g., one of the specified bits) may be changed in the assigned bitmap at operation 820. From example, in some embodiments, as an operation from among the one or more operations are completed, the storage controller (or a corresponding one of the memory translation layers 202) may change a state of a corresponding bit in the assigned bitmap (e.g., by issuing a corresponding ready index).

The specified bits of the assigned bitmap may be monitored to determine whether the specified bits have the changed state at operation 825. For example, in some embodiments, the trigger BITMAP circuit 406 may compare a corresponding compare BITMAP with a corresponding ready BITMAP (e.g., the assigned bitmap) to determine whether all of the specified bits have the changed state. If any of the specified bits do not have the changed state, for example, if any of the specified bits still have the initial state at operation 825 (e.g., NO at operation 825), the method 800 may loop back to operation 815, to monitor the states of the specified bits as the one or more operations are completed. On the other hand, if all of the specified bits have the changed state (e.g., YES at operation 825), an in-order data transfer may be triggered at operation 830, and the data may be transmitted to the host device at operation 835. For example, in some embodiments, the data associated with the host command may be transmitted in a predetermined order (e.g., in a constrained order) regardless of the order that the operations are completed. Once the data is transmitted to the host device, the storage device may transmit a response indicating that the data has been successfully transmitted, and the method 800 may end.

In the drawings, the relative sizes of elements, layers, and regions may be exaggerated and/or simplified for clarity. It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device comprising:
   a host interface to receive a host command from a host device over a storage interface;
   one or more memory translation layers to execute one or more operations associated with the host command to retrieve one or more chunks of data associated with the host command from storage memory;
   a bitmap circuit comprising a bitmap to track a constrained order of the one or more chunks of data to be transferred to the host device; and
   a transfer trigger to trigger a data transfer to the host device for the one or more chunks of data in the constrained order according to a state of one or more bits of the bitmap.

2. The storage device of claim 1, wherein the one or more chunks of data are retrieved from the storage memory in an order that is different from the constrained order.

3. The storage device of claim 1, wherein consecutive bits from among the one or more bits of the bitmap correspond to the constrained order.

4. The storage device of claim 3, wherein an initial bit from among the consecutive bits corresponds to a first chunk of data from among the one or more chunks of data in the constrained order.

5. The storage device of claim 4, wherein a next adjacent bit from among the consecutive bits corresponds to a second chunk of data from among the one or more chunks of data in the constrained order.

6. The storage device of claim 1, wherein the transfer trigger is configured to trigger the data transfer in response to a specified number of bits starting from an initial bit from among the one or more bits of the bitmap having a changed state from an initial state.

7. The storage device of claim 6, wherein the one or more memory translation layers are configured to set a corresponding bit in the bitmap to have the changed state in response to executing a corresponding operation from among the one or more operations associated with the host command.

8. The storage device of claim 7, wherein the one or more memory translation layers are configured to set the specified number of bits to have the changed state in an order that is different from the constrained order.

9. The storage device of claim 6, wherein the bitmap circuit is configured to dynamically change the specified number of bits according to a threshold.

10. The storage device of claim 9, wherein the threshold sets the specified number of bits and a position of the initial bit from among the specified number of bits.

11. A method for triggering a data transfer from a storage device to a host device, the method comprising:
   receiving, by the storage device, a host command from the host device to retrieve data from storage memory;
   assigning, by the storage device, a bitmap for the host command;
   executing, by the storage device, one or more operations associated with the host command to retrieve one or more chunks of the data from the storage memory;
   changing, by the storage device, a state of a corresponding bit from among one or more specified bits in the bitmap in response to an execution completion of a corresponding operation from among the one or more operations;
   monitoring, by the storage device, the specified bits of the bitmap; and
   triggering, by the storage device, a data transfer of the one or more chunks of the data in a constrained order in response to the specified bits of the bitmap having a changed state from an initial state.

12. The method of claim 11, wherein the one or more operations associated with the host command are executed to retrieve the one or more chunks of the data in an order that is different from the constrained order.

13. The method of claim 11, wherein the one or more specified bits correspond to one or more consecutive bits of the bitmap, and the one or more consecutive bits correspond to the constrained order.

14. The method of claim 13, wherein an initial bit from among the consecutive bits corresponds to a first chunk of data from among the one or more chunks of the data in the constrained order.

15. The method of claim 14, wherein a next adjacent bit from among the consecutive bits corresponds to a second chunk of data from among the one or more chunks of data in the constrained order.

16. The method of claim 11, wherein the data transfer is triggered in response to the specified number of bits starting from an initial bit having the changed state.

17. The method of claim 11, further comprising:
   changing, by the storage device, a number of the specified bits according to a threshold.

18. The method of claim 17, wherein the threshold sets the specified number of bits and a position of the initial bit from among the specified number of bits.

19. A storage device comprising:
   a storage controller to execute one or more operations associated with a host command received from a host device over a storage interface, the one or more operations to retrieve one or more chunks of data associated with the host command from storage memory; and
   a bitmap circuit to track a constrained order of the one or more chunks of data to be transferred to the host device, the bitmap circuit comprising:
      an assigned bitmap comprising one or more specified bits corresponding to the constrained order;
      a compare bitmap circuit to generate a compare bitmap according to a count value and a start position indicating the one or more specified bits in the assigned bitmap; and
      a trigger bitmap circuit to compare the assigned bitmap with the compare bitmap to determine a state of the specified bits in the assigned bitmap, and to trigger a data transfer of the one or more chunks of data to the host device in the constrained order according to the state of the specified bits,
   wherein the trigger bitmap circuit is to trigger the data transfer in response to the specified bits having a changed state from an initial state.

20. The storage device of claim 19, wherein the storage controller is configured to change the state of a corresponding bit from among the specified bits to the changed state in response to a corresponding operation from among the one or more operations being completed, and
   wherein the one or more operations are completed in an order that is different from the constrained order.

* * * * *